(12) United States Patent
Koyama

(10) Patent No.: US 9,260,242 B2
(45) Date of Patent: Feb. 16, 2016

(54) TRANSFER APPARATUS

(75) Inventor: Yoichiro Koyama, Inuyama (JP)

(73) Assignee: MURATA MACHINERY, LTD., Kyoto (JP)

(*) Notice: Subject to any disclaimer, the term of this patent is extended or adjusted under 35 U.S.C. 154(b) by 902 days.

(21) Appl. No.: 13/380,537

(22) PCT Filed: Jul. 2, 2009

(86) PCT No.: PCT/JP2009/003071
§ 371 (c)(1),
(2), (4) Date: Dec. 23, 2011

(87) PCT Pub. No.: WO2011/001472
PCT Pub. Date: Jan. 6, 2011

(65) Prior Publication Data
US 2012/0099952 A1   Apr. 26, 2012

(51) Int. Cl.
*B65G 1/04* (2006.01)
(52) U.S. Cl.
CPC .................................. *B65G 1/0435* (2013.01)
(58) Field of Classification Search
CPC .................................................. B65G 1/0435
USPC .................................... 414/280, 283; 294/207
See application file for complete search history.

(56) References Cited

U.S. PATENT DOCUMENTS

| | | | | |
|---|---|---|---|---|
| 2,647,650 A | * | 8/1953 | Sherriff | 414/620 |
| 4,852,928 A | * | 8/1989 | Monforte | 294/207 |
| 5,088,783 A | * | 2/1992 | Squires | 294/81.54 |
| 5,558,483 A | | 9/1996 | Masuda | |
| 5,749,693 A | * | 5/1998 | Hanaya | 414/277 |
| 6,039,375 A | * | 3/2000 | Bauman | 294/119.1 |

FOREIGN PATENT DOCUMENTS

| | | |
|---|---|---|
| JP | 07-309408 A | 11/1995 |
| JP | 11-268898 A | 10/1999 |
| JP | 2001-341807 A | 12/2001 |
| JP | 2002-167008 A | 6/2002 |
| JP | 2005-138949 A | 6/2005 |
| JP | 2008-024493 A | 2/2008 |

OTHER PUBLICATIONS

English translation of Official Communication issued in corresponding International Application PCT/JP2009/003071, mailed on Feb. 23, 2012.
Official Communication issued in International Patent Application No. PCT/JP2009/003071, mailed on Aug. 11, 2009.

* cited by examiner

*Primary Examiner* — Jonathan Snelting
(74) *Attorney, Agent, or Firm* — Keating & Bennett, LLP

(57) ABSTRACT

A transfer device which transfers a clamped load, by sliding the load, between a rack and an elevating table that are adjacent to each other, includes a contact body which comes into contact with the load; an arm which generates, through the contact body, a force in a clamping direction that is a horizontal direction with respect to the load; and a joint which connects the contact body and the arm movably in a vertical direction, without moving the contact body in the clamping direction with respect to the arm.

10 Claims, 6 Drawing Sheets

FIG. 4
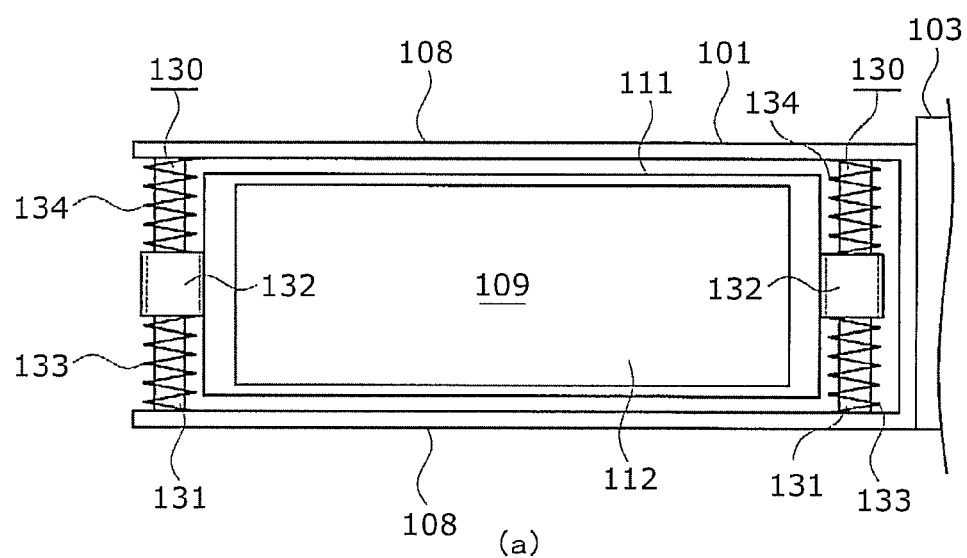
(a)
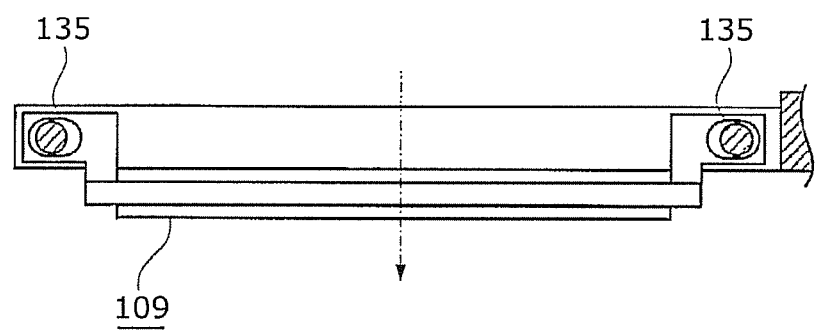
(b)

TRANSFER APPARATUS

BACKGROUND OF THE INVENTION

1. Field of the Invention

The present invention relates to a transfer device which transfers a load, by sliding the load, from a first storage space to a second storage space, and preferably may be used for a stacker crane, a station for automated transfer system, and other applications.

2. Description of the Related Art

A load transfer device is mounted on a stacker crane in order to transfer a load between a rack for holding the load and the stacker crane for loading and unloading the load to and from the rack. Such a load transfer device is also used for a station at which a load is loaded to or unloaded from a transfer vehicle for automatically transferring a load. Examples of a method for transferring a load between the first storage space and the second storage space include: a fork lifting method which includes lifting a load with forks; a suction pick-up method which includes picking up a load by applying suction thereto; a pick-up belt method which includes moving a load by a pick-up belt conveyor, and a pull-up method which includes pulling up a load using a claw placed on the back side of the load.

These methods for transferring have various disadvantages. For instance, in the fork lifting method, the load needs to be moved up and down at the time of transfer, and thus a relatively large space is required in upward and downward directions of the load. As a result, such a space becomes a dead space for a rack for storing the load. In the suction pick-up method, the load is held by a suction cup, and thus a surface condition of the load is limited. In the pick-up belt method, there are many restrictions such as a load having to overhang from a rack. In the pull-up method, a difference in level between a transfer origin and a transfer destination causes damage to a load which results from being scraped at the edge of the transfer destination or collapse of a corner of the load which results from being dropped onto the transfer destination.

Examples of a method for transferring which has relatively fewer disadvantages include a clamping method (see Japanese Unexamined Patent Application Publication No. 2002-167008). The clamping method includes: inserting arms 101 into a space available at the sides or the like of a load 200 in a direction (indicated by an arrow B) opposite to a transfer direction (indicated by an arrow A), as shown in FIGS. 8A and 8B; clamping the load with the arms 101, as shown in FIG. 8C; and sliding and transferring the load by moving the arms 101 holding the load 200 in the transfer direction.

The clamping method has, for example, an advantage of completing transfer in a short time in the case where shapes of loads to be transferred are standardized.

In the clamping method, however, the level of the transfer destination is often set slightly lower than that of the transfer origin so that a load is smoothly transferred. In such a situation, it is not possible to receive, from a surface of the transfer destination, a force for supporting the load from below at the time of transferring the load from the transfer origin to the transfer destination. When a portion in contact with the load cannot support the weight of the load, a frictional force is generated between the portion in contact with the load and the load, which may result in frictional wear of or damage to the portion in contact with the load. In particular, when an elastic body such as rubber is used for the portion in contact with the load, a problem such as necessity of frequently replacing the elastic body occurs. In contrast, when a transfer device continues to support the load, it is necessary to clamp the load excessively, thereby stressing the load. Moreover, releasing the clamped load causes the entire load to fall freely, thereby damaging the load or generating a kinetic friction force on the portion in contact with the load.

SUMMARY OF THE INVENTION

Preferred embodiments of the present invention have been conceived in view of the problems and provide a transfer device which prevents generation of kinetic friction forces on a portion in contact with a load without heavily stressing the load.

A transfer device according to a preferred embodiment of the present invention is a transfer device which transfers a clamped load, by sliding the load, between a first storage space and a second storage space that are adjacent to each other, the transfer device including: a contact body which comes into contact with the load; an arm which generates, through the contact body, a force in a clamping direction that is a horizontal direction with respect to the load; and a joint which connects the contact body and the arm movably in a vertical direction, without moving the contact body in the clamping direction with respect to the arm.

With this structure, for instance, even when the clamped load is transferred from the first storage space, a transfer origin, to the second storage space, a transfer destination, which is at a level lower than the first storage space, the contact body can fall following a fall of the load. Thus, it is possible to transfer the load without generating a kinetic friction force at the portion in contact with the load. Therefore, it is possible to avoid wear or damage of the contact body caused by the kinetic friction force, and to extend a life of the contact body.

Moreover, it is preferred that the joint includes an elastic body which supports the contact body in an upward biased state with respect to the arm.

With this structure, even when the contact body falls following the load, releasing the clamped load allows the contact body to return to a predetermined position with respect to the arm due to the bias of the elastic body. Thus, even when loads are consecutively transferred, it is possible to perform the transfer efficiently.

Furthermore, it is preferred that the joint further includes a second elastic body which provides a downward bias to the contact body with respect to the arm.

With this structure, when, for example, the arm is moved without clamping the load, it is possible to prevent a flutter of the contact body relative to the arm.

Accordingly, preferred embodiments of the present invention achieves both reduction in the stress on the load and extension of the life of the portion in contact with the load, while using the clamping method.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A and 4B are diagrams showing how a contact body is attached in which FIG. 4A is a side view, and 4B is a top view showing an arm of which a portion is omitted.

DETAILED DESCRIPTION OF THE PREFERRED EMBODIMENTS

The following describes a transfer device according to preferred embodiments of the present invention.

Figure 1:
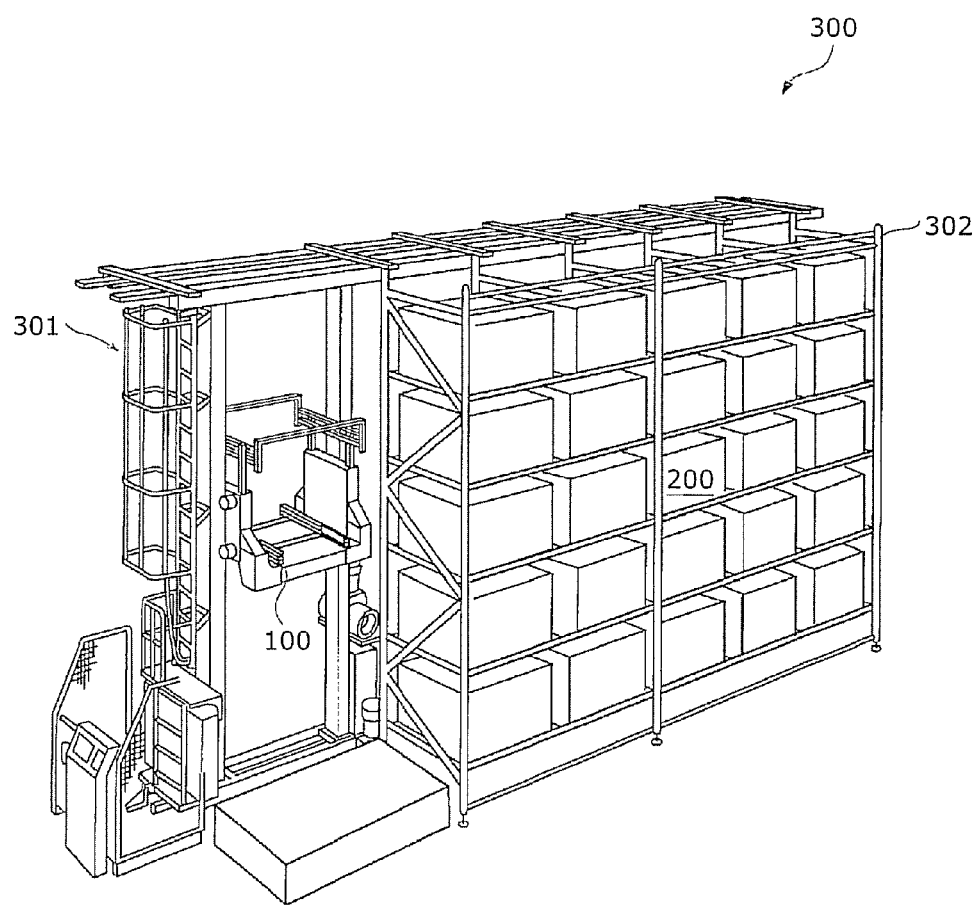
FIG. 1 is a perspective view showing a portion of an automated warehouse provided with a stacker crane including a transfer device.

FIG. 1 is a perspective view showing a portion of an automated warehouse provided with a stacker crane including a transfer device.

As shown in FIG. 1, a stacker crane 301 in an automated warehouse 300 automatically carries a load 200 to a rack 302 or carries the load 200 out of the rack 302. The automated warehouse 300 includes the stacker crane 301, the rack 302 provided along a passage of the stacker crane 301, and a station where the load 200 is put at the time of carrying in and out.

Figure 2:
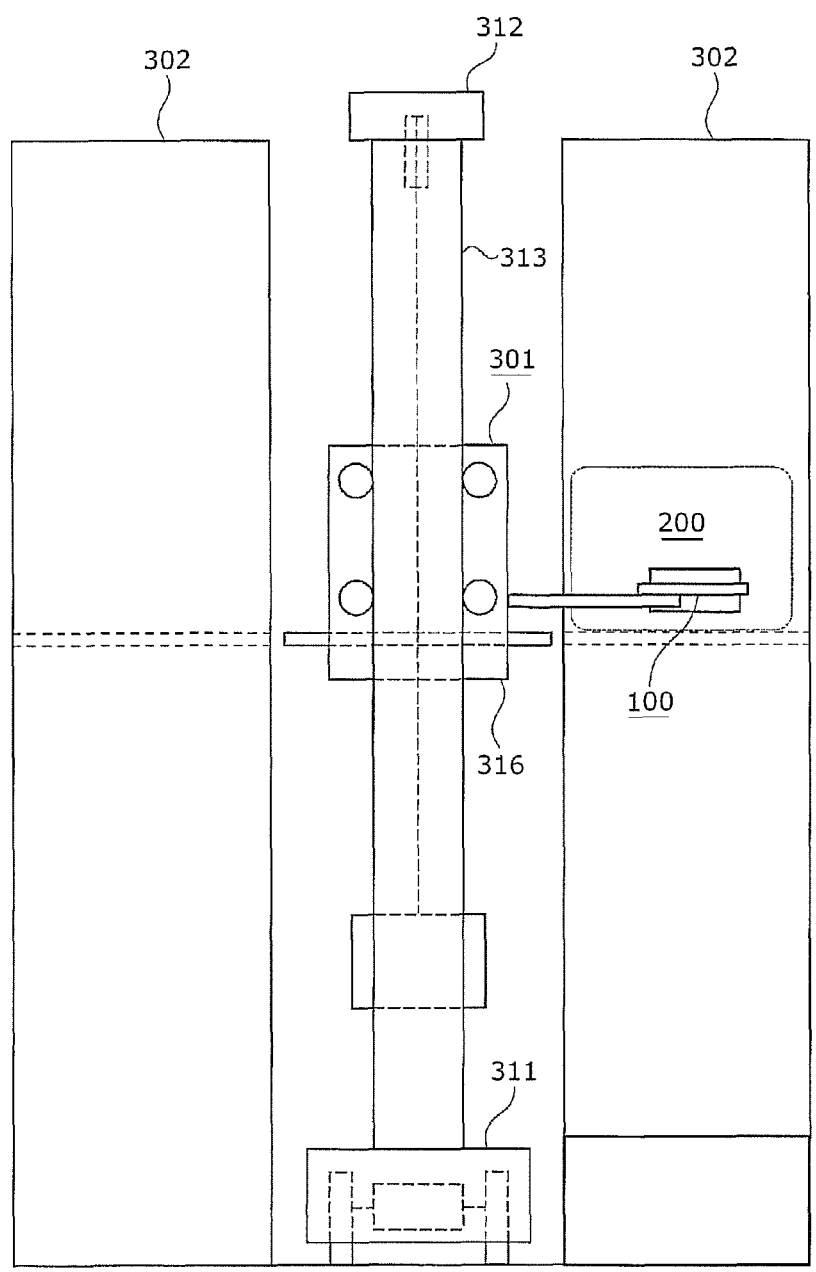
FIG. 2 is a side view schematically showing the automated warehouse.

FIG. 2 is a side view schematically showing the automated warehouse.

The stacker crane 301 includes a framework preferably defined by joining a lower carriage 311 and an upper carriage 312 with a mast 313, and a structure in which an elevating table 316 moves up and down along the mast 313.

A transfer device 100 is attached to the elevating table 316.

Figure 3:
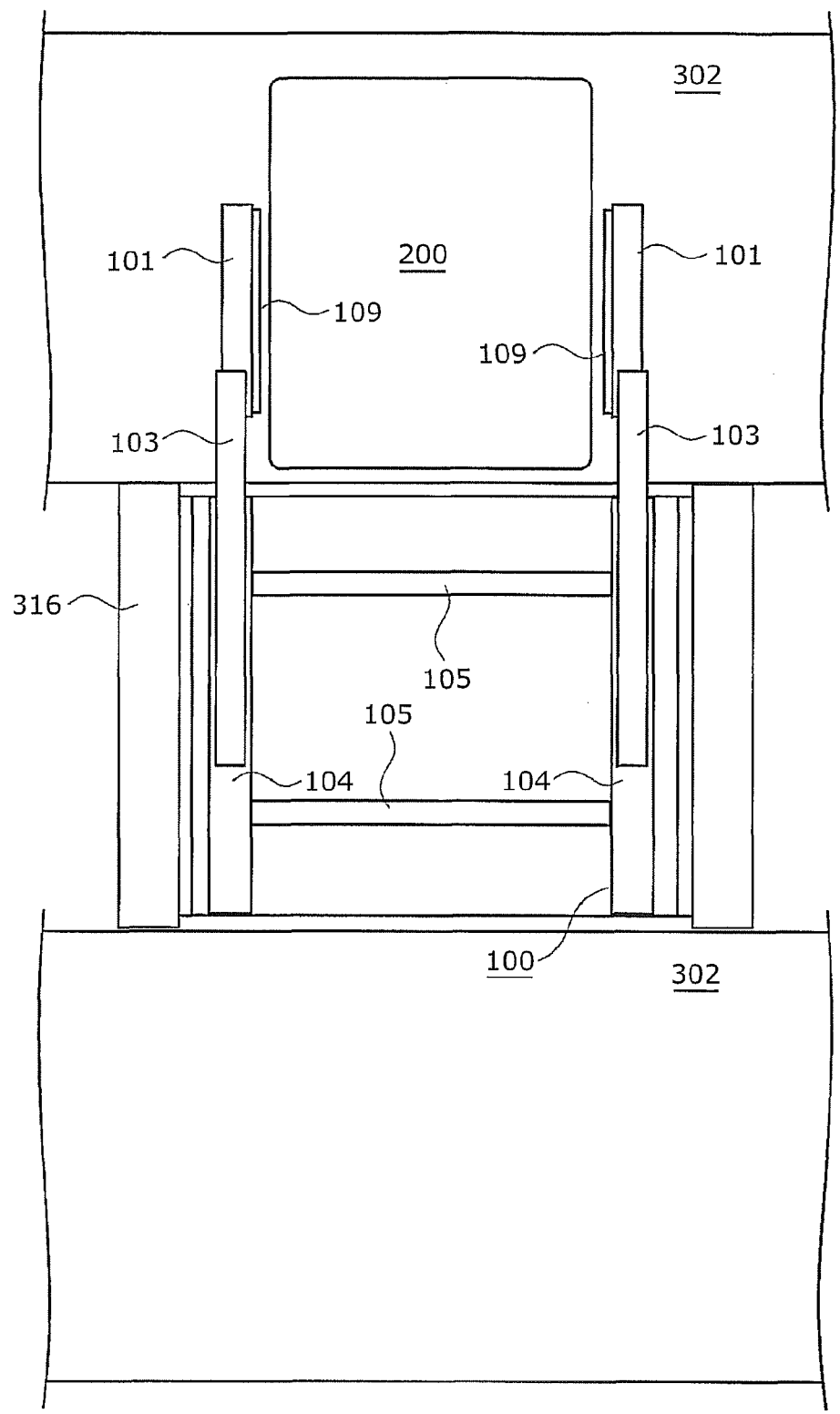
FIG. 3 is a top view showing the transfer device attached to an elevating table.

FIG. 3 is a top view showing the transfer device attached to an elevating table.

As shown in FIG. 3, the transfer device 100 transfers, using the clamping method, the load 200 between the rack 302, a first storage space, and the elevating table 316, a second storage space, and includes arms 101, contact bodies 109, intermediate rails 103, fixed rails 104, and width-changing rails 105.

Each of the arms 101 is a bar member which generates, through one of the contact bodies 109, a force in a clamping direction (a horizontal direction in FIG. 3) with respect to the load 200, and moves, in a space available at the sides of the load 200, along an axis of a transfer direction of the load 200.

Each of the fixed rails 104 is a member fixed to the elevating table 316. Each of the intermediate rails 103 slides along one of the fixed rails 104.

The intermediate rail 103 is a member which slidably retains the arm 101, and is slidably attached to the fixed rail 104. The intermediate rail 103 is arranged to protrude the arm 101 far while maintaining a predetermined structural strength.

The transfer device 100 according to this preferred embodiment has a telescopic structure defined by the fixed rail 104, the intermediate rail 103, and the arm 101. When a driving device (not shown) slides and protrudes the intermediate rail 103 with respect to the fixed rail 104, the arm 101 slides and protrudes with respect to the intermediate rail 103 in conjunction with the operation by the driving device.

Each of the width-changing rails 105 is a rail for moving one of the fixed rails 104 in the clamping direction (the horizontal direction in FIG. 3) so that a distance between the arms 101 is adjusted to clamp the load 200. Moving the fixed rails 104 along the width-changing rails 105 brings the contact bodies 109 into contact with the load 200 via the arms 101. Then, the load 200 is clamped by the contact bodies 109 with a predetermined clamping force generated by further moving the fixed rails 104 along the width-changing rails 105 to narrow the distance between the arms 101.

FIGS. 4A and 4B are diagrams showing how a contact body is attached. FIG. 4A is a side view, and FIG. 4B is a top view showing an arm of which a portion is omitted.

As shown in FIGS. 4A and 4B, the contact body 109 is attached to the arm 101 via joints 130.

The contact body 109 is a bar member which comes into contact with the load 200. In this preferred embodiment, the contact body 109 includes a base plate 111 and an adhering unit 112.

The base plate 111 is a highly-rigid plate-shaped member which provides in a planar manner the clamping force for the load 200, and is attached to the arm 101 via the joints 130 so that the base plate 111 protrudes more to a side of the load 200 than to that of the arm 101.

The adhering unit 112 preferably is an element which adheres to the load 200 and gives to the load a force in the transfer direction through friction. In this preferred embodiment, the adhering unit 112 preferably is a thin plate made of rubber (elastomer), and is attached across the entire surface of the base plate 111, for example.

Each of the joints 130 preferably is a unit which connects the contact body 109 and the arm 101 movably in a vertical direction (vertical direction in FIG. 4A), without moving along the axis of the clamping direction (an arrow indicated in FIG. 4B) with respect to the arm 101. The joint 130 includes a guide rod 131, a slider 132, an elastic body 133, and a second elastic body 134.

The guide rod 131 preferably is a rod-shaped member attached, as a bridge, to two frames 108 attached in a protruding manner to a tip of the arm 101 at a predetermined distance from each other. In this preferred embodiment, the guide rod 131 preferably has a columnar shape.

The slider 132 preferably is a member which is regulated by the guide rod 131 and slides along the guide rod 131. In this preferred embodiment, the slider 131 is arranged such that a guide hole 135 into which the guide rod 131 is inserted penetrates vertically, and one of ends of the slider 132 is fixed to the contact body 109.

The elastic body 133 is a member which supports the contact body 109 in an upward biased state with respect to the arm 101. In this preferred embodiment, the elastic body 133 is a coil spring which supports the contact body 109 via the slider 132 fixed to the contact body 109. The elastic body 133 is arranged so as to coil around the guide rod 131. The elastic body 133 includes a first end in contact with the lower frame 108, and a second end in contact with an undersurface of the slider 132. In this situation, when a downward weight of a load is applied to the contact body 109, the elastic body 133 contracts, and the contact body 109 moves downward with respect to the arm 101. When the weight is removed, the contact body 109 rises to a predetermined position due to the biasing force of the elastic body 133.

The second elastic body 134 preferably is a member which provides a downward bias to the contact body 109 with respect to the arm 101. In this preferred embodiment, the second elastic body 134 preferably is a coil spring which provides a downward bias to the contact body 109 via the slider 132 fixed to the contact body 109. The second elastic body 134 is arranged to coil around the guide rod 131. The second elastic body 134 includes a first end in contact with the upper frame 108, and a second end in contact with a top surface of the slider 132. With this structure, it is possible to prevent the flutter of the contact body 109.

In this preferred embodiment, the guide rod 131, the slider 132, the elastic body 133, and the second elastic body 134 define a set, and the set is provided to first and second ends of the contact body 109. The guide hole 135 provided to the slider 132 preferably is a long hole extending, on a vertical plane, in a direction perpendicular or substantially perpendicular to the axis of the clamping direction. With this, the contact body 109 is capable of tilting on the vertical plane with respect to the guide rod 131.

The following describes operations of the transfer device 100 at the time of transferring the load 200 from the rack 302 to the elevating table 316 of the stacker crane 301.

First, the elevating table 316 moves to a position where the load 200 to be transferred is stored. Here, a surface on which the load 200 is placed is adjusted to be at the same level as a surface of the elevating table 316 on which the load 200 is to be placed, and the surfaces are adjacent to each other.

Next, the intermediate rails 103 are protruded toward the rack 302 with respect to the fixed rails 104. At this phase, the distance between the two arms 101 is adjusted to be slightly greater than a width of the load 200 to be transferred.

The arms 101 are protruded toward the rack 302 until the arms 101 reach a predetermined position with respect to the intermediate rails 103, in conjunction with the protrusion of the intermediate rails 103. Then, the fixed rails 104 are moved in conjunction with the width-changing rails 105, and the load 200 is clamped via the contact bodies 109. In this situation, the contact bodies 109 are attached so as not to move in the clamping direction relative to the arms 101, and thus it is possible to generate a sufficient clamping force between the contact bodies 109 and the load 200.

Next, while the load 200 is being clamped, the arms 101 are retracted concurrently with retraction of the intermediate rails 103 with respect to the fixed rails 104. This generates, in the vertical direction, a static frictional force between the load 200 and the adhering units 112 with respect to the clamping force, and the load 200 is transferred to a side of the stacker crane 301 using the static frictional force.

Figure 5:
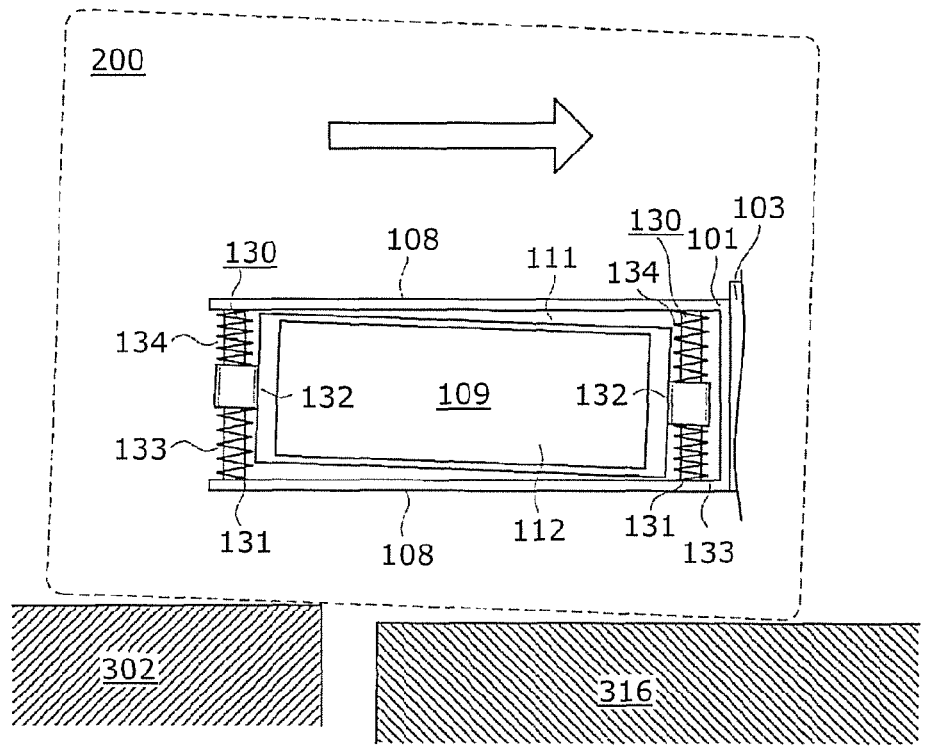
FIG. 5 is a diagram schematically showing a state of transferring a load from a first storage space to a second storage space.

FIG. 5 is a diagram schematically showing a state of transferring a load from a first storage space to a second storage space.

As shown in FIG. 5, in order to smoothly transfer the load 200, the elevating table 316, the second storage space, is regulated to be slightly lower than the rack 302, the first storage space. Thus, the load 200 slightly tilts when straddling the rack 302 and the elevating table 316. Even in this case, the contact bodies 109 tilt relative to the arms 101 due to a relationship between the guide rods 131 of the joints 130 and the guide holes 135, long holes, and follow the tilt of the load 200. Therefore, it is possible to continue the transfer without generating an excessive force between the load 200 and the adhering units 112 such as the kinetic friction force.

Figure 6:
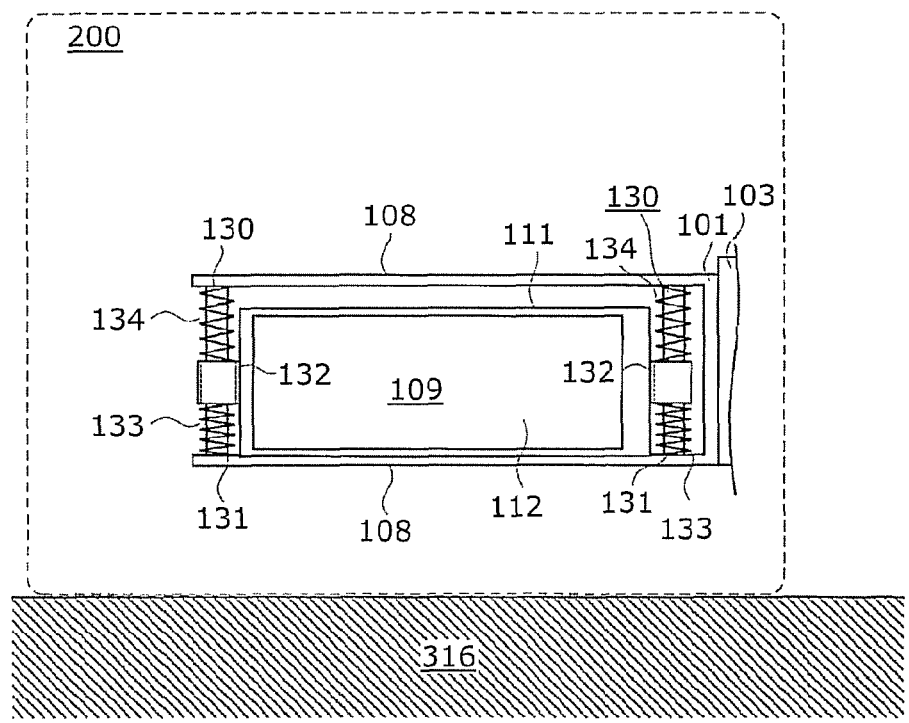
FIG. 6 is a diagram schematically showing a state of the load transferred to the second storage space.

FIG. 6 is a diagram schematically showing a state of the load transferred to the second storage space.

As shown in FIG. 6, the contact bodies 109 follow the load 200 placed on the elevating table 316 positioned lower than the rack 302, and are weighed down with respect to the arms 101. Consequently, it is possible to transfer the load 200 from the rack 302 having the different level to the elevating table 316 without causing the load 200 and the adhering units 112 of the contact bodies 109 to be worn down, and to extend a life of the adhering units 112.

Lastly, the clamped load 200 is released, and the transfer is completed.

Figure 7A:
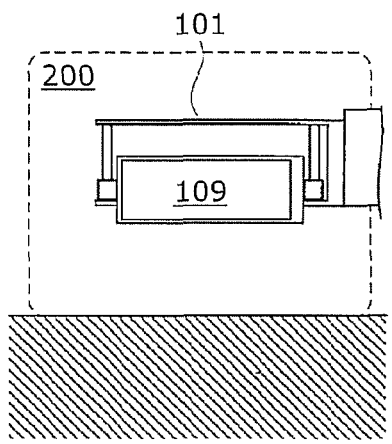
FIGS. 7A and 7B are diagrams schematically showing an operation in the case of not including an elastic body and a second elastic body.
Figure 7B:
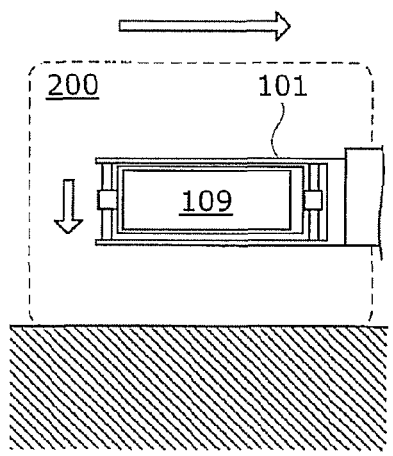
Figure 8A:
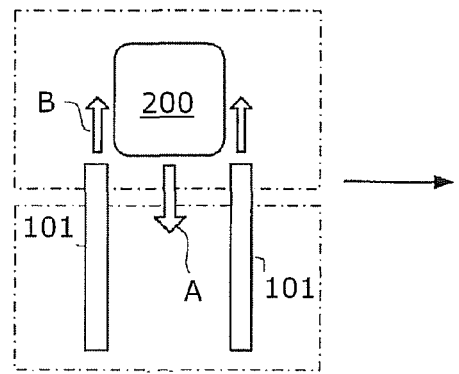
FIGS. 8A-8D is a diagram showing a concept of transfer in a clamping method.
Figure 8B:
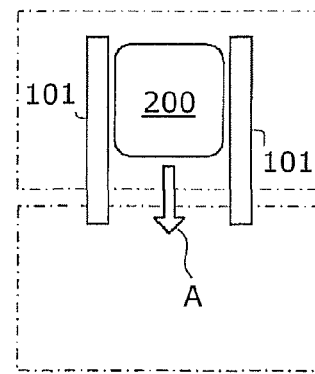
Figure 8C:
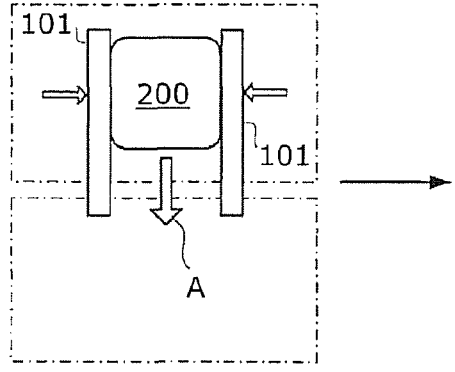
Figure 8D:
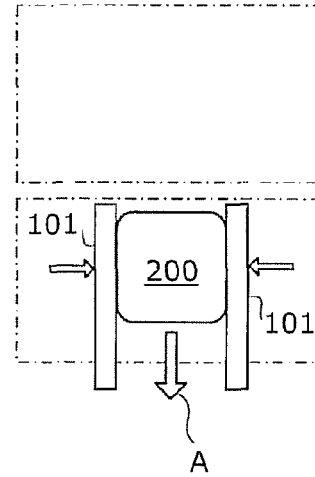

It is to be noted that although this preferred embodiment has described the case where the elastic body 133 and the second elastic body 134 are preferably used, the present invention is not limited to this case. Even in the case of not using the elastic body 133 and the second elastic body 134, as shown in FIGS. 7A and 7B, it is possible to solve the problems by moving the arms 101 up and down. Specifically, as shown in FIG. 7A, the contact bodies 109 are not biased relative to the arms 101, and thus the contact bodies 109 are positioned lowest with respect to the arms 101. In this situation, the arms 101 are moved closer to the load 200, and the contact bodies 109 are made in contact with the load 200. Next, even when the arms 101 are moved down as shown in FIG. 7B, a position of the contact bodies 109 in contact with the load 200 does not change. Therefore, horizontally moving the arms 101 in the state shown in FIG. 7B transfers the load 200, and it is possible to cause the contact bodies 109 to follow a movement of the load 200 even when there is the level difference between the first storage space and the second storage space.

Various preferred embodiments of the present invention can be used in, for example, an automated warehouse or a factory where an automated transfer vehicle transfers a load from a predetermined place to another place.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A transfer device which transfers a clamped load, by sliding the load, between a first storage space and a second storage space that are adjacent to each other, the transfer device comprising:
    a first contact body and a second contact body that contact the load;
    a first arm and a second arm that generate, respectively through the first and second contact bodies, a force in a clamping direction that is a horizontal direction with respect to the load when the first and second contact bodies come into contact with opposing sides of the load; and
    a first joint and a second joint that respectively connect the contact body and the arm, without moving the contact body in the clamping direction with respect to the arm; wherein
    in response to a tilting of the load, the first and second contact bodies tilt according to the tilting of the load;
    the first and second contact bodies are movable in a vertical direction at the first joint and the second joint, respectively, such that the first and second contact bodies tilt in respective vertical planes that are adjacent to the load and perpendicular or substantially perpendicular to the clamping direction; and
    the first and second joints each include a first elastic body that supports the respective first or second contact body in an upward biased state with respect to the respective first or second arm.

2. The transfer device according to claim 1, wherein the first and second joints each include a second elastic body that provides a downward bias to the respective first or second contact body with respect to the respective first or second arm.

3. The transfer device according to claim 2, wherein:
    the first and second joints each include a slider that is fixed to the respective first or second contact body and that moves along a guide rail; and the respective first or second contact body is tilted, relative to the respective first or second arm, according to the movement of the slider along the guide rail.

4. The transfer device according to claim 3, wherein the first elastic body of each of the first and second joints is in contact with a lower surface of the slider.

5. The transfer device according to claim 3, wherein the second elastic body of each of the first and second joints is in contact with an upper surface of the slider.

6. The transfer device according to claim 3, wherein the slider moves along the guide rail according to biasing forces applied by the first elastic body and the second elastic body.

7. The transfer device according to claim 2, wherein the second elastic body is a coil spring.

8. The transfer device according to claim 1, wherein:
the first and second joints each include a slider that is fixed to the respective first or second contact body and that moves along a guide rail; and
the respective first or second contact body is tilted, relative to the respective first or second arm, according to the movement of the slider along the guide rail.

9. The transfer device according to claim 8, wherein the slider moves along the guide rail according to a biasing force applied by the first elastic body.

10. The transfer device according to claim 1, wherein the first elastic body is a coil spring.

* * * * *